(No Model.)

D. A. SNELL.
Apparatus for Feeding Cattle.

No. 233,888.          Patented Nov. 2, 1880.

Attest
Fred G. Dieterich
Wm. Bagger

Inventor
D. A. Snell
Per C. A. Snow & Co.
Attys.

UNITED STATES PATENT OFFICE.

DAVID A. SNELL, OF WAMEGO, KANSAS.

APPARATUS FOR FEEDING CATTLE.

SPECIFICATION forming part of Letters Patent No. 233,888, dated November 2, 1880.

Application filed August 25, 1880. (No model.)

*To all whom it may concern:*

Be it known that I, DAVID A. SNELL, of Wamego, in the county of Pottawatomie and State of Kansas, have invented certain new and useful Improvements in Devices for Feeding Cattle and Sheep; and I do hereby declare that the following is a full, clear, and exact description of the invention, which will enable others skilled in the art to which it appertains to make and use the same, reference being had to the accompanying drawings, which form a part of this specification.

Figure 1:
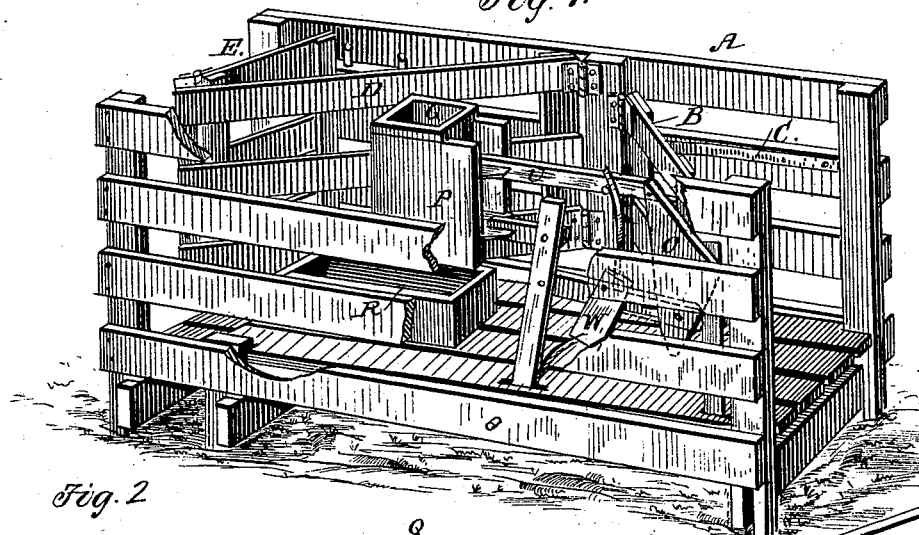
Figure 2:
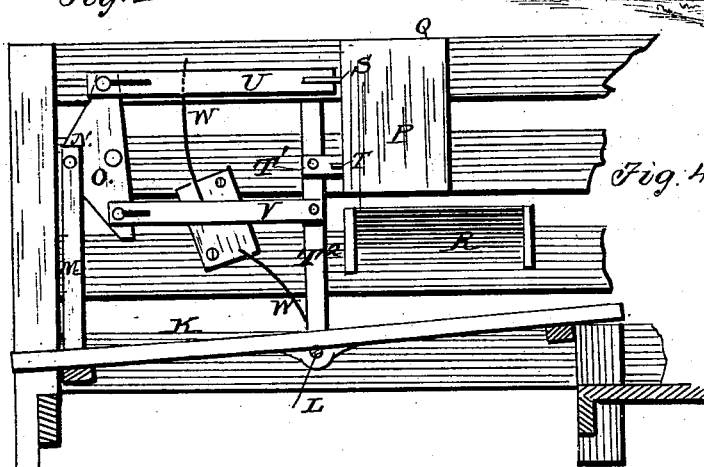
Figure 4:
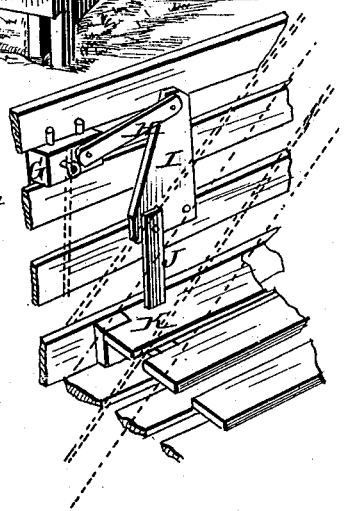
Figure 3:
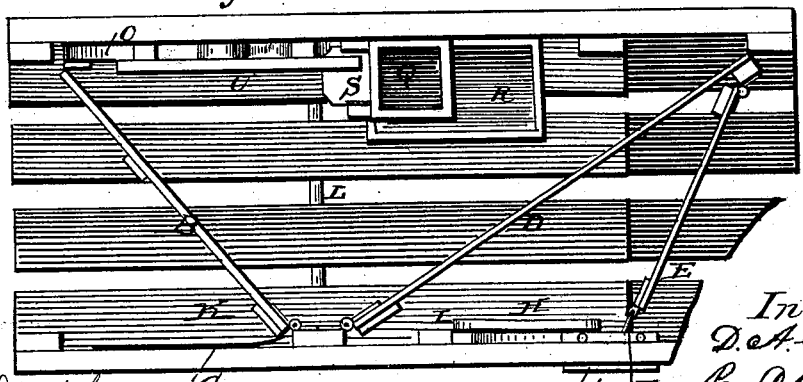

Figure 1 is a perspective view. Fig. 2 is a longitudinal sectional view. Fig. 3 is a top view, and Fig. 4 is a detail view.

Corresponding parts in the several figures are denoted by like letters of reference.

This invention relates to feeding-racks for sheep and other cattle; and it consists in certain improvements in the construction of the same, which will be hereinafter fully described, and particularly pointed out in the claims.

In the drawings hereto annexed, A represents a rack or stall of suitable size, provided at one end with a diagonally-located gate, B, opening outward, and kept automatically in a closed position by a suitably-arranged spring, C.

D is a diagonal gate, hinged to one side of the rack or stall, and opening toward the front, as shown. To the free end of said gate is hinged another gate, E, located transversely across the stall and having its free end connected by a link, F, with a slide, G, having a longitudinal movement upon the side of the stall or rack. The said slide is connected by an arm, H, with the upper end or arm of a bell-crank lever, I, pivoted to the inner side of the stall, as shown.

The lower end or arm of the bell-crank lever I is connected by a pivoted rod, J, with the front end of a trip-board, K, pivoted in the stall upon a transverse shaft, L. The rear end of trip-board K is connected by a pivoted rod, M, with the rear arm, N, of a T-lever, O.

To one of the inner sides of the stall A, some distance in front of the shaft of the tripping mechanism, is secured a chute, P, having at its upper end a hopper, Q, to receive the grain, &c., which is to be fed to the cattle. Below the said chute is arranged a feed-trough, R, and in the said chute are placed two horizontal slides, S T, the space between which constitutes a measure for one feed of grain. The upper slide, S, is connected by a slotted rod, U, to the upper arm of a T-lever, O. The lower slide, T, is connected by a short pivoted arm, T', to a vertical arm, $T^2$, pivoted on the rod L, and this vertical arm $T^2$ is connected by a slotted bar, V, to the lower arm of the T-lever O.

The connection between the connecting-rods and lever should be made by means of pins and slots, as shown, and springs W are arranged to actuate the slides, thus compelling one to close before the other is opened, and thus avoiding any waste or excessive measure of grain.

From the foregoing description, taken in connection with the drawings hereto annexed, the operation and advantages of my invention will be readily understood.

Primarily the front gate is opened, thus causing the feed-grain to drop from the hopper down into the measuring-chute. When the first sheep steps upon the trip-board, the front gate is automatically closed, thus barring the entrance of other sheep; at the same time the lower slide in the feed-chute is opened, thus permitting the prescribed quantity of grain to drop into the trough, where it is readily accessible to the animal. When done the sheep is obliged to pass out through the rear gate, thus automatically opening the front gate for the admission of another animal, when a repetition of the above-described operation takes place.

Having thus described my invention, I claim and desire to secure by Letters Patent of the United States—

1. The combination of a rack or stall, A, an automatic rearward-opening diagonal gate, D, a trip-board, K, a barring-gate, E, and mechanism consisting of the slide G, link F, bell-crank lever I, and pivoted rod J, for connecting the barring-gate E to the trip-board K, constructed and operating substantially as and for the purposes set forth.

2. The combination of the stall or rack A, the diagonal gate D, the barring-gate E, hinged to the latter and connected with the trip-board K through the media of the slide G, link F, bell-crank lever I, and pivoted rod J, the feed-chute P, provided with the slides S and T, connected with the trip-board K by means of the arm U V T' T², and the T-lever and rod M, constructed and operating substantially as and for the purposes set forth.

In testimony that I claim the foregoing as my own I have hereto affixed my signature in presence of two witnesses.

DAVID ACER SNELL.

Witnesses:
J. LEWIS BROWNE,
W. D. EMBLEY.